United States Patent [19]
Masters

[11] 3,805,234
[45] Apr. 16, 1974

[54] DIGITAL DATA TRANSMISSION SYSTEM

[75] Inventor: Harvey M. Masters, Ellicott City, Md.

[73] Assignee: Westinghouse Electric Corporation, Pittsburgh, Pa.

[22] Filed: July 31, 1972

[21] Appl. No.: 276,345

[52] U.S. Cl. .................. 340/146.1 BA, 340/146.1 C
[51] Int. Cl. ......................H041 1/14, G08c/25/02
[58] Field of Search .........340/146.1 BA, 146.1 C, 340/146.1 D

[56] References Cited

UNITED STATES PATENTS

| | | | |
|---|---|---|---|
| 2,495,705 | 1/1950 | Devaux | 340/146.1 BA |
| 3,228,000 | 1/1966 | Collis | 340/146.1 BA |
| 3,473,150 | 10/1969 | McClelland | 340/146.1 C |

FOREIGN PATENTS OR APPLICATIONS

| | | | |
|---|---|---|---|
| 44-26,806 | 11/1969 | Japan | 340/146.1 BA |

*Primary Examiner*—Felix D. Gruber
*Assistant Examiner*—R. Stephen Dildine, Jr.
*Attorney, Agent, or Firm*—J. B. Hinson

[57] ABSTRACT

Apparatus for transmitting digital data and for correcting errors which occur in the transmission of the data while maintaining high transmission efficiency is disclosed. Digital data words are sequentially transmitted with each of the data words containing a field code related to the sequence in which the data words are extracted from the data source. A receiver detects and retransmits each of the digital data words including the field codes. The retransmitted data words are detected by the transmitter and compared to the words as originally transmitted. If an error is detected, the transmission sequence is repeated beginning with the word found to contain an error. This unique arrangement of the field codes permits the receiver to determine which words have been verified as correct by the transmitter. Transmission is not interrupted. Supervisory signals are not exchanged between transmitter and receiver.

11 Claims, 12 Drawing Figures

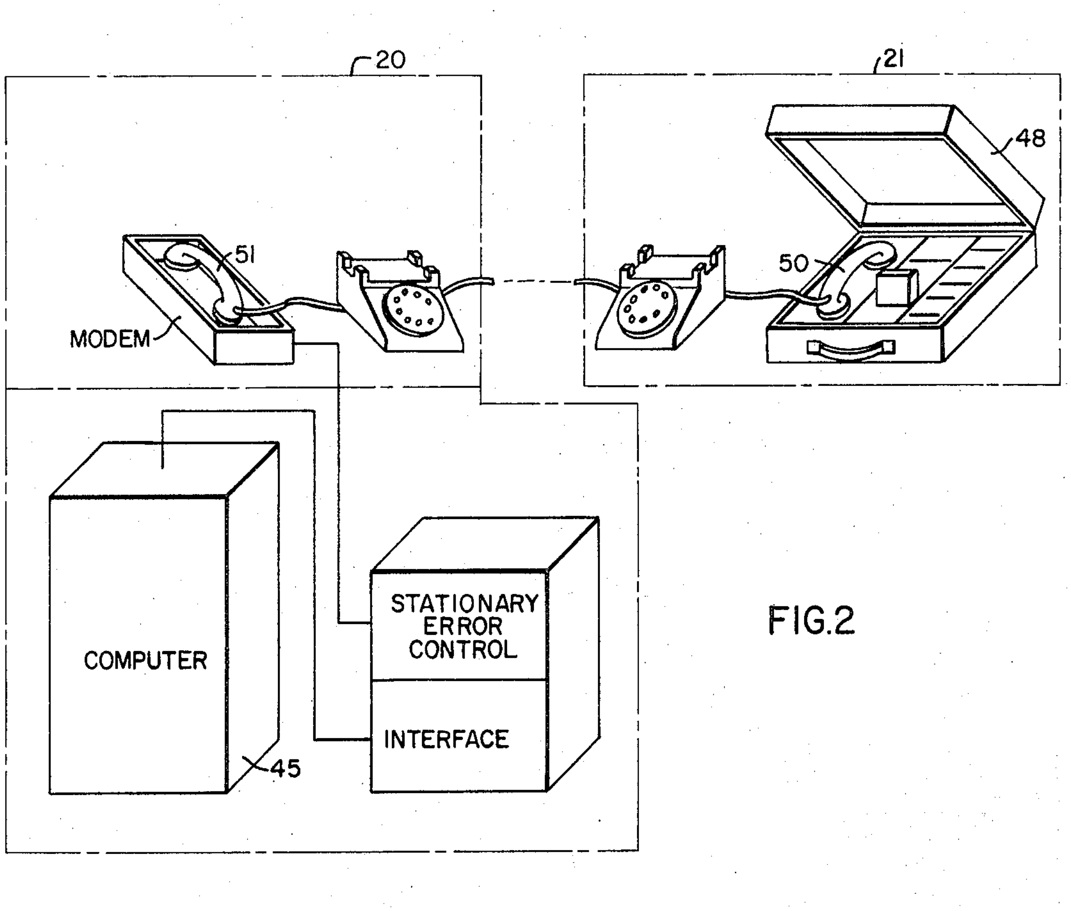
FIG.2
FIG. 5A
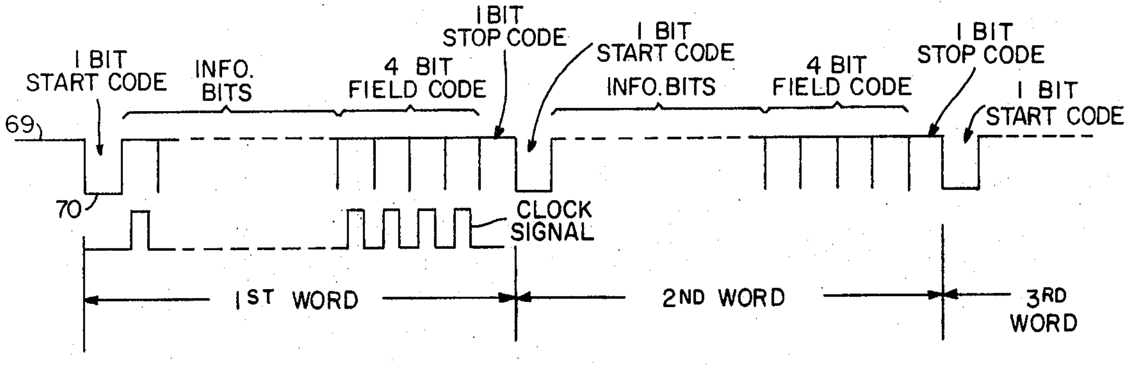
| FIELD CODE | BIT 1 | BIT 2 | BIT 3 | BIT 4 |
|---|---|---|---|---|
| 1 | 1 | 1 | 0 | 0 |
| 2 | 0 | 1 | 0 | 1 |
| 3 | 1 | 0 | 1 | 1 |
| 4 | 0 | 0 | 1 | 0 |
FIG. 5B

DIGITAL DATA TRANSMISSION SYSTEM

BACKGROUND OF THE INVENTION

1. Field of the Invention

The invention relates to data transmission systems and more particularly to digital data transmission systems which include means for correcting errors which occur in the process of transmitting the data.

2. Description of the Prior Art

Many methods have been utilized in prior art systems in order to transmit digital data between two points with a high probability that errors introduced during the transmission were detected and corrected. These methods generally transmit blocks of words during a single transmitting cycle rather than transmitting one or more words. These blocks may contain hundreds or thousands of bits of information. One prior art method utilized coded digital data with each block transmitted containing redundant information. Equipment was provided at the receiving end to check the codes and correct any errors detected. The corrections made were based on an examination of the redundant data. One disadvantage of such a system is the fact that the error correction capability is limited and can completely fail when large numbers of errors are produced. Such a system is not suitable for operation in an environment characterized by impulse noise such as in the public telephone network. Alternatively, in some prior art systems, transmission ceases after the block of data is sent. The transmitter waits for a signal from the receiver indicating the status of the block of data it received. If an error was detected at the receiver, the transmitter is notified and the entire original block of information is retransmitted. If no errors are detected, the next block is transmitted. In either case the transmitter is required to contain relatively complicated encoding equipment and the receiver must include relatively complex error detection circuits. Both transmitter and receiver must contain large memories to store the block of information. These features add considerably to the cost and complexity of the data system. The transmission efficiency is very low in cases where the message contains less than a few hundred bits of information.

SUMMARY OF THE INVENTION

The above disadvantages of prior art systems are substantially overcome by the disclosed system. In the disclosed system digital data words are sequentially transmitted with each of the digital data words including a field code related to the sequence in which the digital data words are taken from the data source. The digital data words are detected, temporarily stored and retransmitted by the receiver. The data words are retransmitted are compared at the transmitter to the data word as transmitted to detect any errors which may have occurred in the transmission process. When an error is detected, the transmission sequence is repeated, beginning with the word which contained the error. The unique arrangement and treatment of the field codes permits the receiver to determine which words have been verified at the transmitter.

This method of detecting errors substantially overcomes the disadvantages associated with prior art apparatus. An important advantage of the disclosed system is the capability of detecting errors involving any number of bits within an individual data word or errors in any number of adjacent or non-adjacent data words. The disclosed system requires substantially less hardware than prior art data transmission systems. This can be particularly advantageous when it is desired that the data transmission system be portable and in systems where cost is an important factor.

DESCRIPTION OF THE DRAWINGS

FIG. 2 is a block diagram of a test system incorporating the data transmission system which is the subject of this invention;

FIG. 5A illustrates the bit structure of the transmitted words;

FIG. 5B is an example of a choice of field code patterns;

FIG. 9B also provides a flow chart of the last word routine for the receiver system of FIG. 9.

DETAILED DESCRIPTION

Figure 1:
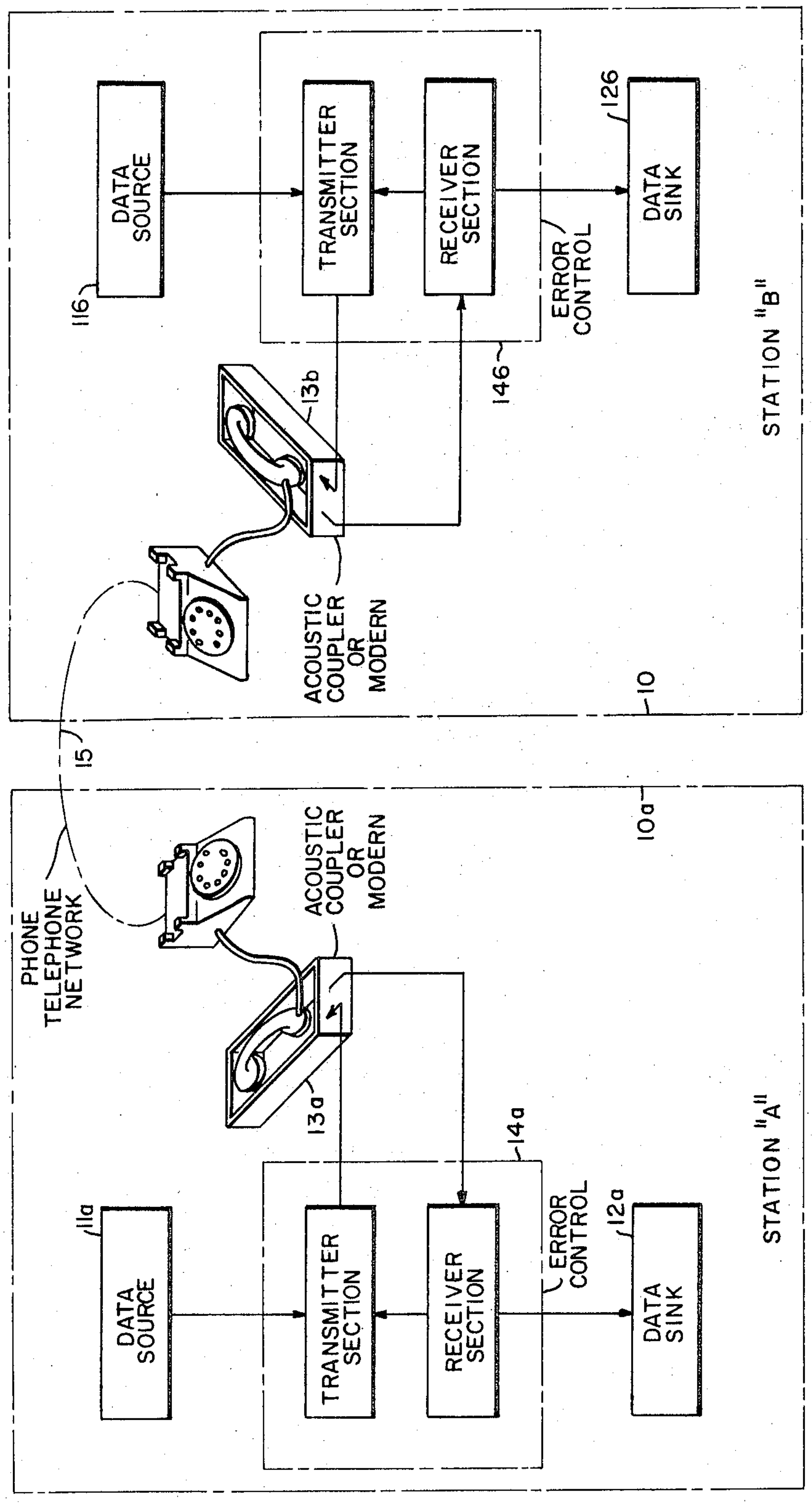
FIG. 1 is a block diagram of the error-control system used with the public telephone network.

FIG. 1 illustrates the use of the Error-Control System with the standard telephone network. Two identical stations, A and B illustrated at reference numerals 10A and 10B, exchange digital communications with one another. Either station, A or B, may choose to transmit whike the other station receives. Each station has some device, or group of devices, which generate the data to be transmitted, referred to as the "data source". These data sources are illustrated at reference numerals 11*a* and 11*b*. Also, each station has some device, or group of devices, which receive the transmitted data, called the "data sink", illustrated at reference numerals 12*a* and 12*b*.

Each station also has a modem or acoustic coupler. illustrated at reference numerals 13*a* and 13*b*. These modems convert input digital information to analog signals suitable for transmission over the telephone network, and analog signals from the telephone network to digital information. Acoustic couplers are preferred because they perform the same functions as modems, without requiring a hard-wired connection to the telephone lines. Information is coupled to the acoustic coupler through the transmitter and receiver of the telephone hand set. A modem or an acoustic coupler may be used at either station. Modems and acoustic couplers are readily available items well known in the industry.

The error-control device at station A is identical to the one at station B. These devices are illustrated at reference numerals 14*a* and 14*b*. Each of the error-control devices 14*a* and 14*b* consists of a transmitter and a receiver. When inactive, that is, when the two stations are not communicating, both of the error-control devices 14*a* and 14*b* are in the receive mode. Whenever one station wishes to send information to the other station, the error-control device of the sending station is switched to the transmit mode.

For example, assume station A 10*a* is to transmit information to station B 10*b*. The process begins with a "Begin Transmit" command, generated by the data source 11*a* of station A, which causes the station A error control 14*a* to switch to the transmit mode. The first word to be sent is transferred from the data source 11*a* to the error control transmitter where it is temporarily stored and then transferred to the acoustic coupler 13*a* for transmission over the telephone network, 15. The word is received by the acoustic coupler 13*b* at station B and transferred to the error control receiver where it is temporarily stored to await verification by a comparator circuit in the station A transmitter. As the word is received by the station B error-control receiver, is is simultaneously returned to the send input of the station B acoustic coupler 13*b* for retransmission to station A. Because the two acoustic couplers 13*a* and 13*b* are operating in the full-duplex mode, the word is being returned to station A at the same time it is being received at station B. At station A, the word is being transmitted and received simultaneously, with the returned word being delayed by an amount required for it to make the round trip between stations.

A comparator circuit in the station A transmitter compares the returned word bit-by-bit as it is received in the transmitter section with the previously stored original word. Because of the previously mentioned delay in receiving the returned word, the transmission of the first word from Station A is completed before the word is completely returned, and, consequently, before the comparison is completed. However, station A does not wait for the comparison to be completed; instead, the error-control transmitter takes the second word of the message from the data source 11*a*, stores it temporarily, and transmits it to station B. While the second word is being transmitted by station A, the comparison of the first word is completed. Station A error control transmitter then knows what its next actions will be. If the comparison indicates both words were identical, station A transmitter will take the third word of the message from the data source 11*a* and send it to station B when the transmission of the second word is completed. If, however, the comparison indicated differences in the two words, station A, upon completing the transmission of the second word, will transfer the first word from the error-control transmitter storage and retransmit it to station B. This will be followed by a retransmission of the second word, also transferred from the station A transmitter storage. The process continues until the words are favorably compared, at which time new words are taken from the data source 11*a* and transmitted to station B. Station B always returns the words as they are received.

The error-control transmitter assigns a field code of a few bits to each word transmitted. The error-control receiver at station B is able to determine, by inspection of the field codes it receives, which words the station A transmitter has compared and found to be transmitted error free. It is able to do this without any exchange of information of any kind with the station A transmitter. Because of this feature, transmission from station A to station B is never interrupted. Information is constantly and continually transmitted, with no delays between transmitted words, even when errors are detected at the transmitter and retransmission of those words occur. Station A continues transmitting until all words of the message from the data source 11*a* have been transmitted and correctly compared.

The above discussed procedure is reversed to transmit data from station B to station A.

An application of the error-control system with the telephone network is illustrated in FIG. 2. In this example, a permanently located computer 45 is used to control and process data from a portable and remotely located testing station 21. The portable testing station 21 can be carried to any location accessible via a telephone network for purposes of testing circuit cards, for example, at that location. Commands from the computer 45 cause the test station 21 to apply required input signals to the circuit under test and to measure specified points. Measured data is returned to the computer for analysis and comparison with programmed values. When discrepancies are found, the computer transmits diagnostic information to the test set for use by the test set operator.

It should be emphasized that the system illustrated in FIG. 1 requires that the digital data words be transmitted from station A to station B and vice versa. The modems and error control systems must be capable of operating in this manner. However, the process of transmitting data and correcting errors is independent of the direction of transfer. Therefore only the transfer of data words from station A to station B will be described in detail.

Figures 3, 4:
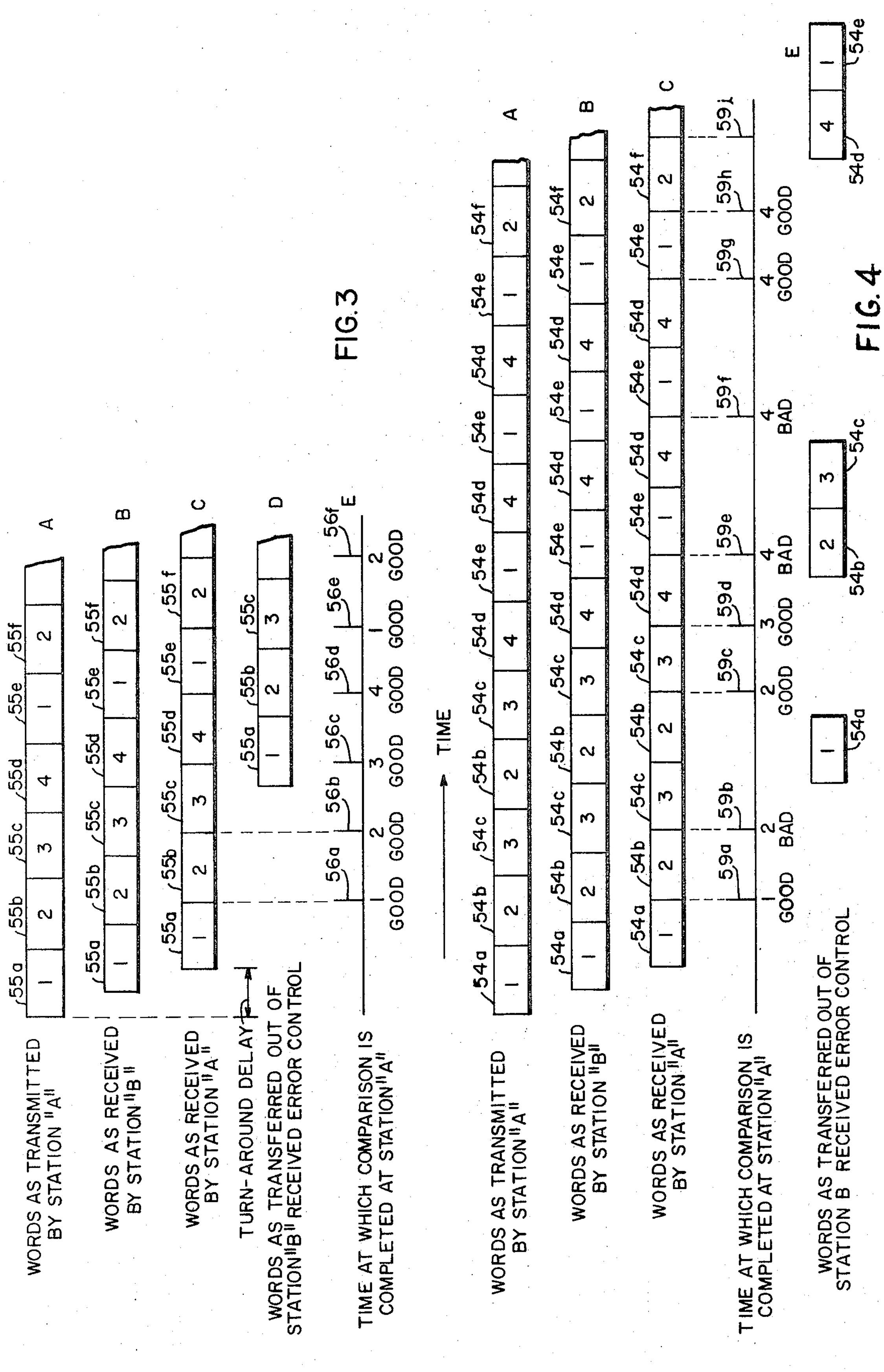
FIG. 3 is a diagram showing the time relationships between the transmission, checking and outputting of the data words.
FIG. 4 is a diagram illustrating the same relationships as in FIG. 3 when errors are detected.

In the preferred embodiment of the system data words are transmitted sequentially with no time delay between adjacent words. Each data word includes a field code whose function will be described in detail later. There are four distinct field codes which, for purposes of discussion, are assigned numbers 1 through 4. These field codes are sequentially assigned in ascending order to the words as they are transmitted. The relationship between field codes and data words, assuming no errors are made during transmission, is illustrated in FIG. 3A through 3E. In FIG. 3A, each data word transmitted is represented by a rectangle with a number representing the field code assigned to the word positioned in that rectangle. For example, the first four words transmitted are assigned field codes 1 through 4 and are respectively illustrated at reference numerals 55*a*–55*d*. The field codes are then repeated beginning with a field code of 1 for the fifth word transmitted as illustrated at reference numeral 55*e*. The field codes are repeated in this sequence as many times as necessary to transmit the entire message. FIG. 3A further illustrates that each word is serially transmitted with no time delay between adjacent words.

FIG. 3B illustrates the words shown in FIG. 3A as they arrive at the receiver having been delayed by the time required for them to be transmitted over the telephone network. The data words illustrated in FIG. 3B are identical to their respective counterparts illustrated in FIG. 3A provided no errors have been generated in the communication channel between transmitter and receiver. The data words illustrated in FIG. 3B are identified with the same reference numeral as used to identify the corresponding word in FIG. 3A in order to emphasize this identity.

The data words received at station B and illustrated in FIG. 3B are retransmitted bit by bit as they are received and returned to station A. The transmitted data words of FIG. 3A are shown in FIG. 3C as they return to station A. The delay time required for each word to make the round trip is labeled the "turnaround delay".

As the digital data words illustrated in FIG. 3A are transmitted from station A to station B, they are stored in a memory in the transmit error control (FIG. 1). However, no more than two words are ever stored at any given time. Additionally, the data words as received by station B, illustrated at reference numerals 55*a* through 55*f* of FIG. 3B, are retransmitted to station A. Each of the retransmitted words are shown in FIG. 3C, at reference numerals 55*a* through 55*f*, in the proper time relationship to the words previously discussed. As each of the words illustrated in FIG. 3C are received at station A, they are compared on a bit-by-bit basis to the original word transmitted and previously stored at station A. After each word has been compared to the original word as transmitted, a decision is made as to whether or not the words are alike and consequently properly received at station B. The times when these decisions are made are illustrated at reference numerals 56*a* through 56*f* of FIG. 3E. For example, a decision that the first word with a field code of 1 was properly transmitted is made at a point illustrated at reference numeral 56*a* of FIG. 3E. Decisions that subsequently transmitted words were transmitted correctly are made at points 56*b* through 56*f*. That is, the decision is made when the last bit of the returned word is received at station A.

Since FIGS. 3A through 3E assumed that all data words were transmitted error free between station A and station B, the above described transmission sequence continues until all words comprising the message have been transmitted.

The receiver error control at station B includes a memory for storing two data words, but not their associated field codes which are no longer needed once the words are stored. After a complete word has been received, the contents of one of these memories is outputted from the Error Control System and the newly received word is stored in that memory, provided the field codes are in the normal sequence. An abnormal field code sequence indicates that a transmission error has been made and that selected words are being retransmitted. The word sequences illustrated in FIGS. 3A through 3E assumes no transmission errors, with FIG. 3D illustrating the sequence and times at which these data words are transferred from the memories in the receive error control to the receiver output bus.

FIGS. 4A through 4E illustrate an example of sequences in which data words are transmitted from station A to station B when errors are introduced in the transmitting channel. As in the above discussion, each word transmitted is represented by a rectangle with a number representing the field code of the word positioned in that rectangle.

As previously discussed, each word transmitted is checked for errors, and, when an error is found, the transmission sequence is restarted beginning with the word which was improperly transmitted. Since the error checking method requires that each word received by station B be retransmitted to station A for comparison with the original word transmitted, there is necessarily some time difference between the transmission of a word and the checking of the accuracy of the transmission. That is, while a word with field code "n" is being transmitted, returned word with field code "n-1" is checked for accuracy and a decision is made. Consequently, even before the word with field code "n" has been completely transmitted, the transmitter section decides which word is to be transmitted next.

In FIGS. 4A through 4E the sequential words of the message are identified by reference numerals 54*a* through 54*f*. When a word is retransmitted due to the detection of an error in the transmission thereof, the reference numeral is not changed. Examination of FIG. 4A shows that data words identified by reference numerals 54*b* through 54*e* are each retransmitted at least one time due to errors in transmission of these words.

FIGS. 4A through 4E, respectively illustrate the data words as transmited by station A, the data words as received by station B, the returned data words as received by station A, the times at which decisions are made as to the accuracy with which specific data words were transmitted, and the data words are transferred out of the error control receiver to the receiver output buss.

The first data word of the message, illustrated at reference numeral 54*a* was correctly transmitted with the decision that this word was correctly transmitted being made at a point illustrated at reference numeral 59*a* of FIG. *4d*. The transmission and receive cycle for this word is completed when it is outputted from the Error Control System as illustrated at reference numeral 54*a* of FIG. 4E. The same reference numeral is retained in FIGS. 4A through 4E to emphasize that the same data word is being illustrated with the different figures indicating only different phases of the process.

The second word of the message, illustrated at reference numeral 54*b* is improperly transmitted due to an error being introduced into the communication channel. As previously discussed, this decision is made by comparing the returned word, illustrated at reference numeral 54*b* of FIG. 4C, with the original data word transmitted. The time at which the decision is complete is illustrated at reference numeral 59*b*, FIG. *4d*. Due to delays in the transmission channel, the decision that this data word was improperly transmitted was not made until the transmission of the following word of the message, illustrated at reference numeral 54*c*, of FIG. 4A has already started. For convenience, the remainder of the third word of the message is transmitted, and then the second and third words of the message are retransmitted. On the second attempt, these words are properly transmitted with the points at which these decisions are made being respectively illustrated at reference numerals 59*c* and 59*d* of FIG. 4D. The sequence and time at which these words are transferred of the Error Control System is illustrated in FIG. 4E.

For the purpose of further illustrating the error correction process, the fourth word of the message, first illustrated at reference numeral 54*d* of FIG. 4A will be assumed to be improperly transmitted on both the first and second attempts. The time at which decisions that this word was improperly transmitted are respectively illustrated at reference numerals 59*e* and 59*f* of FIG. 4D. Finally, a decision that this word was properly transmitted is made at a point illustrated at reference numeral 59*g* of FIG. 4D. Following the transmission of the fourth word of the message, subsequent words of the message are transmitted and the field codes begin to repeat. The first two of these subsequent words are illustrated at reference numerals 54*e* and 54*f* of FIG. 4A.

FIG. 5A illustrates the word format used in transmitting data in the above described system. Two complete data words are shown in order to clearly show the sequential nature of the data transmission.

When no data is being transmitted, the output signals from the acoustic couplers 13*a* and 13*b* of FIG. 1 to the error control circuit is at a high level as illustrated at reference numeral 69 of FIG. 5A. This signal is continuously monitored by the error-control receiver. When a start code is recieved, indicated by the output signal going low as shown at reference numeral 70, a clock is started to generate a signal having a pulse position such that it can be used to shift the bits of the data word into a shift register. Immediately following the start code 70 is a series of information bits. The number of information bits can be selected to fit the immediate application. (For example, 16 bits). Sequentially following the information bits is a four-bit field code, and a one-bit stop code. The stop code is by definition a bit which is always high. The stop code is necessary to assure that the following start code can be detected, because, by definition the start code is a signal generated when the received signal goes from a high to a low level. The details of the clock signal for one word are shown in FIG. 5A. Clock signals for previous and subsequent data words are similar to the clock signal illustrated in FIG. 5A.

Any number of field code combinations can be selected. One such choice is given in FIG. 5B.

For purposes of this figure, "1" and "0" are respectively used to represent the high and low levels of a two-level digital signal. Arrangements are chosen to make it unlikely for one valid field code to be changed, due to transmission errors, into a second valid field code. In the examples given in FIG. 5B, at least two and usually three bits must be changed to convert one code into another one. Although a field code of only four bits wide has been found satisfactory, additional bits in each field code would reduce the probability of conversion from one valid code to another. The function of the field codes will be subsequently described in detail.

Figure 6:
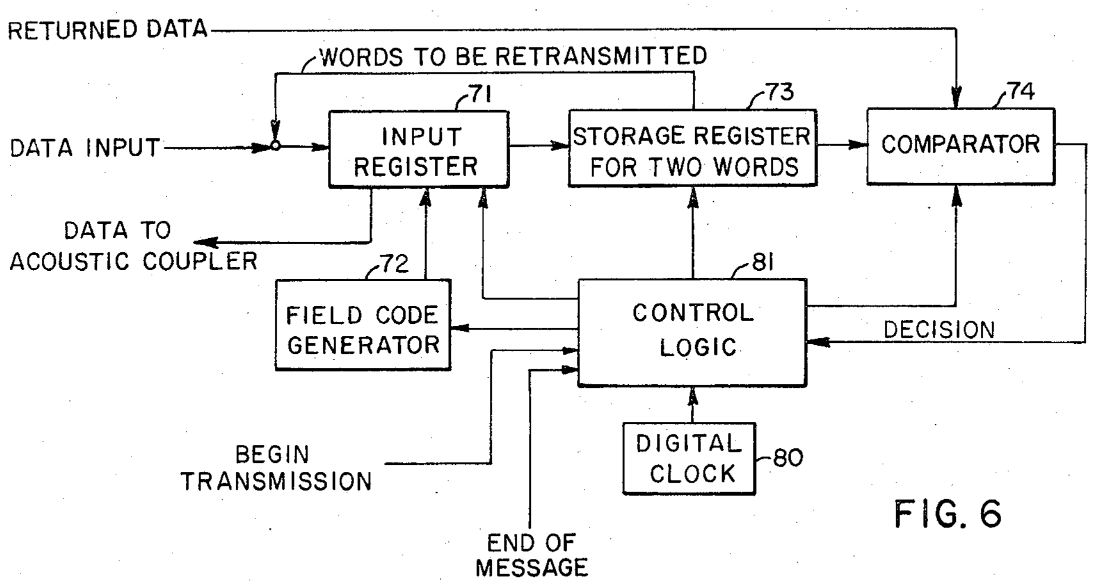
FIG. 6 is a functional block diagram of the data transmission system.

FIG. 6 is a functional block diagram of the transmit error control system. The illustrated system may be used as the transmit error control system of station A or of station B. From this diagram (FIG. 6) it can be seen that the transmission portion of the error control system receives four input signals. These are a begin transmission signal, an end of message signal, the data input signal, and the returned data for purposes of checking transmission errors.

The operation of the transmit error control system will be explained using as an example the transmission of data from station A to station B. The transmission of data in the reverse direction is identical except for the origin of the various signals to the error control system.

The transmit error control receives begin transmit, data input, and end of message signals from the data source, 11*a* of FIG. 1.

The transmission process begins when the data source sends the "begin transmit" signal to the error control transmitter along with the first word to be transmitted.

The data is first stored in input register 71. A field code generator 72 generates the appropriate field code, in this case field code 1. This composite data word (data plus field code) is stored in a two word storage register 73 and coupled to the acoustic coupler 37 for transmission. When the first word has been completely transmitted, the second word is taken from the data source 11a and loaded into input register 71. A field code of 2 is generated and combined with the second data word. The resulting word is stored in register 73 and then transmitted by the acoustic coupler. As the second word is being transmitted, the first data word and its associated field code are returned and compared by comparator 74 with the original word 1 stored in register 73. If comparison indicates that first word as returned is identical with this word as sent word 3 will be loaded into input register 71, when word 2 has completed transmission, assigned field code 3 and stored in 73 and transmitted. As long as the comparisons by the comparator 74 indicates that no errors have been introduced, the process continues. The next word from the data source will be assigned field code 4, the next one field code 1, the next field code 2, etc. If an error is detected by comparator 74 between the returned word and the stored original word, a new word is not taken from the data source, 11*a*. Instead, the original word is transferred from register 73 to register 71 and retransmitted after which the second word stored in 73 will be transferred to register 71 and also retransmitted. If still received in error, the process will be repeated.

It is the responsibility of the Control Logic 81 to see that the sequences of operation are performed as described above. The Digital Clock 80 provides a source of timing signals.

When all data words have been taken from the data source 11*a*, it sends an "End of Message" signal to the Error Control System transmitter. Transmission ceases after the last word transmitted has been returned and correctly compared.

Figure 7:
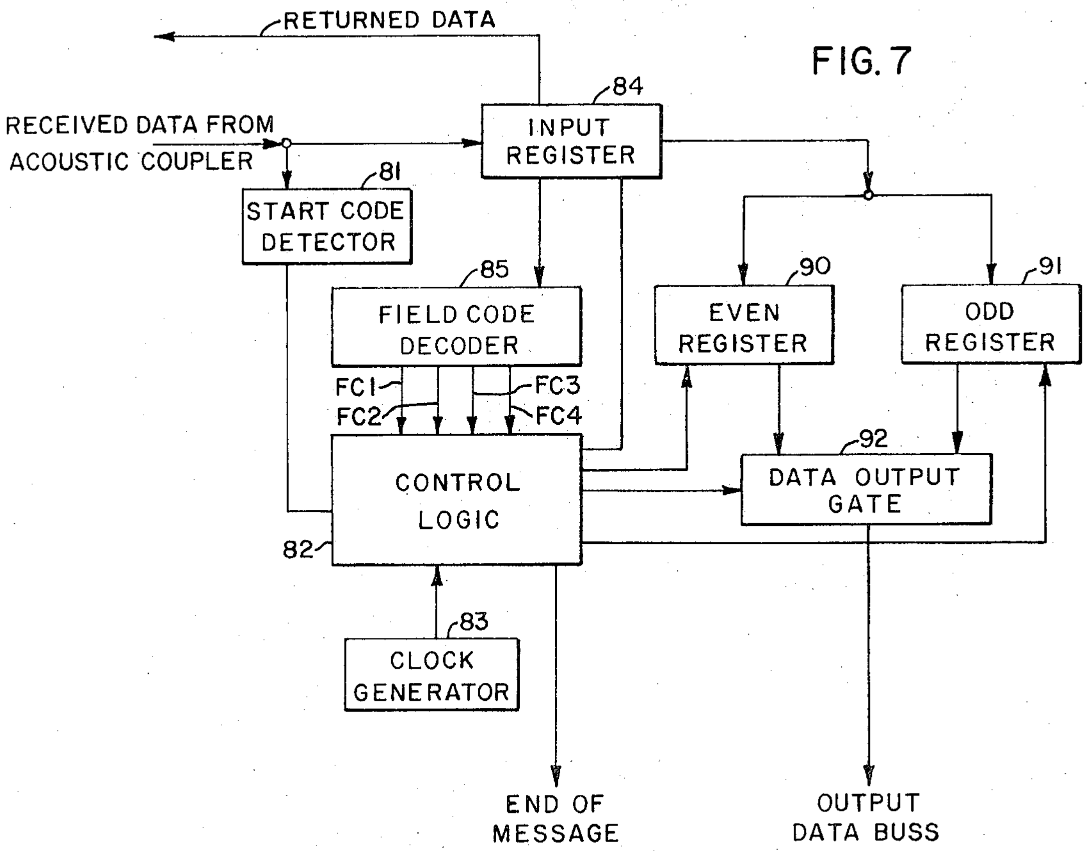
FIG. 7 is a functional block diagram of the receiver.

FIG. 7 is a functional block diagram of the receive error control system. The data signal from the acoustic coupler is coupled to a start code detector 81 and to an input register 84. When a start code is detected, the control logic 82 couples clock pulses from a clock generator 83 to the input register 84. The clock pulses shift the bits of the data word into the input register 84. When a complete data word has been shifted into the input register 84, field code detector 85 examines the field code portion of the data word and generates signals indicative of the field code associated with the data word. The word stored in the input register 84 is then transferred to either the even or the odd register 90 or 91, depending on whether the field code is even or odd.

The field codes are one of the unique features of the system and provide the means by which the receiver determines which words have been verified by the transmitter as correct. The field codes permit the receiver to make these decisions without the necessity of exchanging verifying signals between receiver and transmitter as in other systems.

Only received words with field codes 1 or 3 are stored in the Odd Register 91. Likewise, only received words with field codes 2 or 4 are stored in the Even Register 90.

Any received word with a legitimate field code is always stored in one of these two registers. The previous contents of that register is either destroyed or outputted as a good word when the new word is entered, depending upon field codes of previously received words. For example, if a new word with field code 2 is received, and if a word having field code 2 were previously stored in the Even Register 90, this is an indication that the new word is a retransmission and, consequently, it replaces the old word in the Even Register 90. But if the contents of the Even Register had been a word with field code 4, that word would be outputted as a good word before the new word with field code 2 was stored. In brief, receiving a new word in the expected field code sequences verifies the word stored in the previously received and stored word having an odd field code. The previously received and stored words having an even field code are similarly verified. That is, receiving field code 1 means the previously stored word with field code 3 is good. Receiving field code 3 means the previously stored word with field code 1 is good. Likewise, receiving 2 indicates 4 has been verified at the transmitter and is good. If 4 is received, 2 is outputted as good.

The control logic 82 selects which of the words in these registers are to be coupled to the output data buss. The control logic 82 also generates an end of message signal to indicate when the message has ended. As the data is being shifted into the input register 84 it is also simultaneously shifted out as a return data signal (previously described) to station A so that this data can be compared to the signal as originally transmitted in order to detect transmission errors, as previously described.

The system described above is suisable for use in both station A and in station B.

Figure 8:
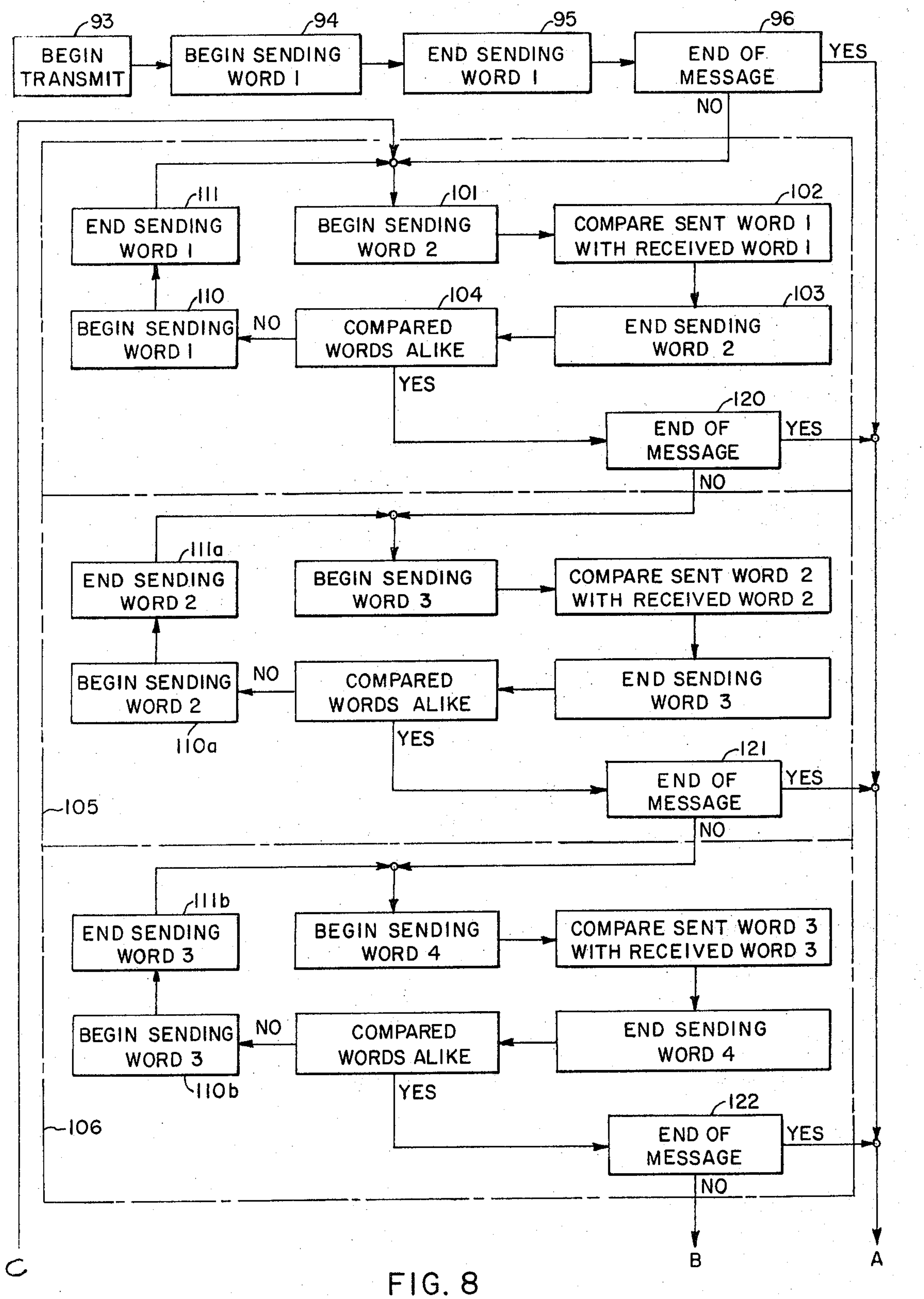
FIGS. 8 and 8B are flow charts which define the transmitting system.

FIG. 8 is a flow chart defining the detailed functional steps performed by the previously described system in transmitting data. The illustrated process is applicable to transmitting data in either direction.

The transmitting process begins with a "Begin Transmit" signal generated by the data source. The step of detecting this signal is illustrated functionally at reference numeral 93 of FIG. 8A.

The data source transfers the first word to be transmitted to the error-control transmitter. The transmission of this word is begun and completed as illustrated functionally at reference numerals 94 and 95.

After the transmission of the first word has ended it is necessary to determine if this is the end of the message. If only one word is to be transmitted, the data source will send an "End of Message" signal to the error-control transmitter after it has transferred that word. This step is shown functionally at reference numeral 96.

Assuming that no end of message signal is generated, the transmission of the second word will begin immediately following the transmission of the first word. During the transmission portions of the first and second words, the first word is returned from the receiver. The returned word will be compared with the first word as transmitted. This comparison must (in the preferred system as illustrated) be completed during the transmission of the second data word. When the comparison is completed, the decision (alike or not alike) is temporarily memorized. These steps are shown functionally as reference numerals 101 and 102 of FIG. 8A.

When the second word has been completely transmitted, the decision memory is inspected to determine whether or not errors were introduced in the first word by the transmitting channel, based on a comparison of the first word as transmitted to the first word as returned. These functional steps are shown at reference numerals 103 and 104. If the decision memory indicates the two words were alike, indicating word 1 was properly transmitted, a decision is made as to whether or not word 2 is the last word of the message. This step is illustrated at reference numeral 120. Assuming that the first word was properly transmitted and that word two was not the end of message, the third word of the message will be transmitted in a manner identical to that used in transmitting the second word. The steps to complete transmission of the third word are enclosed by a dotted line and identified by reference numeral 105. Similarly the functional steps for transmitting words four and one are shown at reference numerals 106 and 107 of FIGS. 8A and 8B, assuming as the above explanation does, that no errors are made in transmitting the data. The above steps are repeated until an end of message signal is generated.

Returning now to the functional block diagram illustrated in FIG. 8A and to the step where the second word of the message is being transmitted (reference numeral 101), and assuming that the compare step illustrated at reference numeral 104 indicates that word one was not properly transmitted, the transmission cycle as previously described is changed in that words one and two are retransmitted. The process of retransmitting word one is indicated functionally at reference numerals 110 and 111. After the first word of the message has been retransmitted, the second word is retransmitted as illustrated at reference numeral 101, and the transmitting cycle proceeds in a normal manner as previously described. Similar steps for retransmitting words with a field code of 2, 3, and 4 corresponding to the second, third and fourth words are respectively illustrated at reference numerals 110*a*–110*c* and 111*a*–111*c*. This cycle is repeated for all subsequent words of the message.

Figure 8B:
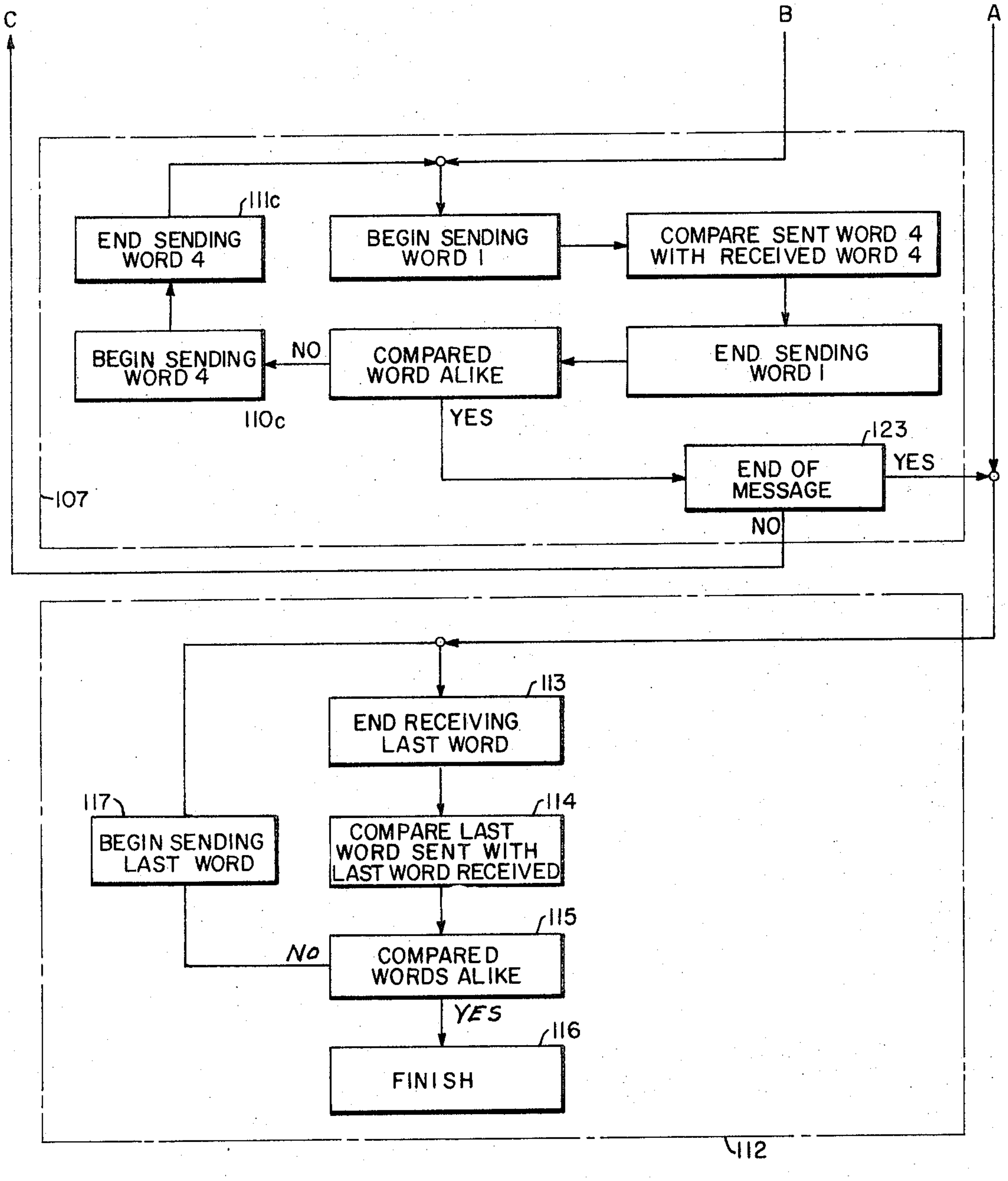

Assuming now that the message to be transmitted contains only one word, an end of message signal generated by the data source following the transfer of word 1 to the error-control transmitter and illustrated functionally at reference numeral 96, causes the sequence to transfer to the last word routine illustrated functionally at reference numeral 112 of FIG. 8B after the transmission of word 1 is completed. This end of message signal may be a digital word transmitted in the normal manner but having a special code. It may also be a special digital signal which is independent of the data signal generated by the data source. The first step of this routine, after word 1 has been returned to the transmitter, is to compare the word one as transmitted with the word one as received. If the word transmitted is identical to the one received, the transmission of the single word message is finished. These steps are illustrated functionally at reference numerals 113 to 116. Conversely, if the word transmitted is not identical to the word received, the word one is retransmitted and the comparison repeated. This process is repeated until the comparison indicates that the last word of the message was properly transmitted. The functional steps of the last word routine are illustrated at reference numerals 113 through 117 of FIG. 8B. A similar end of message signal is generated when either word two, three, four or one is the last word of the message. The functional steps illustrating these signals are shown at reference numerals 120–123 of FIGS. 8A and 8B. The last word routine, illustrated at reference numeral 112, is always executed following the transmission of the last word of the message. It is to be noted that the last word routine illustrated at reference numeral 112 is only one example of a means of ending the transmitting cycle. For example, the transmitter could transmit words indicating End of Message after the last word transmitted was determined to be correct.

Figure 9A:
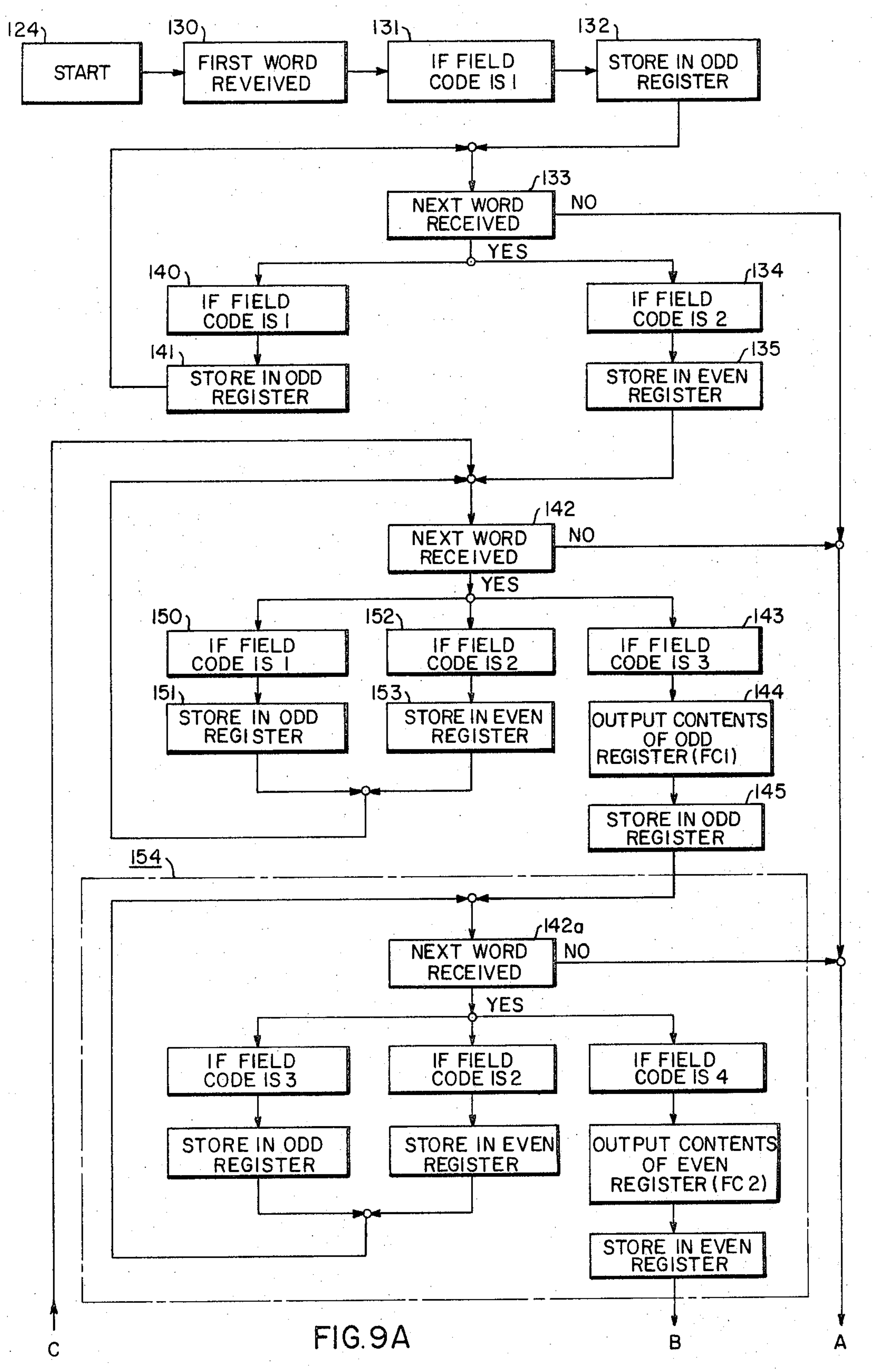
FIGS. 9A and 9B are flow charts which define the receiving system.
Figure 9B:
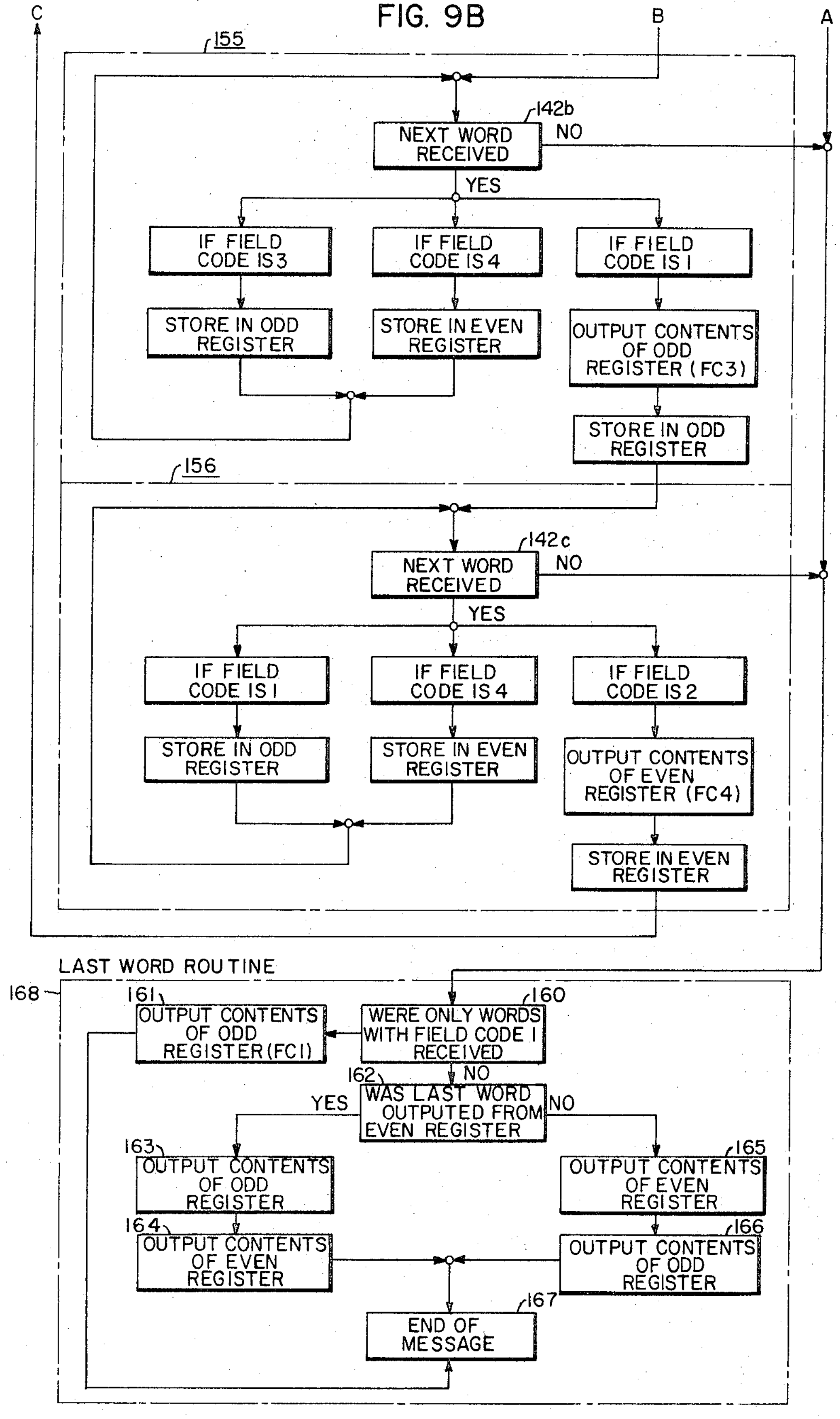

FIGS. 9A and 9B are functional block diagrams of the error-correction system used in the receiver. A start signal is generated by detecting the first time when the output signal of the acoustic couplers changes from a high to a low valve. A functional block diagram for detecting the start signal is shown at reference numeral 124 of FIG. 9A.

After the start signal has been detected, the first word of the message, provided its field code is one, is stored in the odd register. These steps are functionally shown at reference numerals 130, 131, and 132. After the first word with a field code of one has been stored in the odd register, the next word is received and stored in the even register if it has a field code of two. These functional steps are shown at reference numerals 133, 134 and 135 of FIG. 9A. If instead, the field code of the second word received were a one, that word would be stored in the odd data register, replacing the word originally stored there. These functional steps are shown at reference numeral 140 and 141, and are only executed when an error is detected in transmission of a one word message. If the word in a message of only one word is not transmitted accurately the second time, the process proceeds through the functional block steps indicated at reference numerals 140 and 141 for a second time. This procedure continues until the single word message is accurately received, indicated by no subsequent words being received. This step is functionally illustrated at reference numeral 133.

Conversely, if the second word transmitted has a field code of two, indicating the message contains more than one word, that word is stored in the even register as indicated functionally at reference numerals 134 and 135. If the transmission of the third word begins within a predetermined period of time, which is functionally checked by a step identified at reference numerals 142, one of three processes will occur, depending upon the field code of the third word received. Assuming that the field code of the third word is three, indicating that the previously transmitted word with a field code of one was correctly transmitted, the content of the odd register (which contains a word with field code 1) will be coupled to the output data buss as a data signal and the new data word with the field code three will be stored in the odd register. These steps are shown illustrated functionally at reference numerals 143, 144 and 145 of FIG. 9A.

If the field code of the next word received illustrated functionally at step 142 was one, indicating that the previously transmitted data word with this field code was incorrectively transmitted, this word will be stored in the odd register to await verification by the transmitter comparator. These steps are shown functionally at reference numerals 150 and 151.

Assuming the next word received at step 142 had a field code of one, indicating that an error had been made in the transmission of word one and that words having field codes of one and two are being repeated, the next word received will have a field code of two and will be stored in the even register. These steps are shown functionally at reference numerals 152 and 153.

If word 1 is again transmitted in error, words with field codes 1 and 2 will again be retransmitted, received, and stored as explained previously. The process continues until the transmitter verifies that word 1 was correctly transmitted. Then, following the transmission of words 1 and 2, a word with count field 3 is transmitted and received. The contents of the odd register will be outputted and the new word stored in the odd register as shown functionally by functional block 143, 144 and 145 as previously described.

The reception of a word with a field code of three always indicates that the data word with a field code of one has been properly transmitted and can be outputted as data correctly received. This is true because a word with field code three will not be transmitted until after the previous word with field code one has been returned to the transmitter and found to be free of errors.

This completes the process for all conditions whereby the receiver senses that the word it has received with field code one has been correctly transmitted. It then outputs that word as good data. It also stores words with count fields two and three while they are being tested by the transmitter. The subsequent data words having field code two, three and four are similarly outputted as good data with the functional block diagrams being shown within the dotted lines 154, 155 and 156. Following completion of the steps illustrated functionally at reference numeral 156, the sequence returns to block 142 where the receiving process continues until all words of the message have been received.

The last word of the message is detected at the functionally illustrated blocks 133, 142 and 142*a* through 142*c*. When it is determined that there are no additional words to be received, the words stored in the odd or even memories are outputted by a last word routine illustrated functionally be reference numeral 168. The first step in the last word routine is to determine if the message consisted of only one word. The functional step to perform this decision is indicated at reference numeral 160. If only words with a field code of one were received, then the message contained only one word, and the contents of the odd register is outputted and the receive cycle is completed. These functional steps are illustrated at reference numerals 160, 161 and 167. Conversely, if the message contained more than one word, two words must be outputted. It is necessary to determine from which memory the last word was outputted and then output the contents of the other memory first. The functional steps to perform this are illustrated at reference numerals 162 through 166. When the contents of both memories have been outputted, the receive cycle ends as illustrated functionally at reference numeral 167.

The means for sensing that the last word has been received in functional blocks 133, 142, and 142*a* through 142*c* has been explained by the fact that no additional words are received. It is to be noted that other methods of sensing a last word could also be used, for example, a special word to indicate "End of Message" could be sent by the transmitter and detected by the receiver.

I claim as my invention:

1. A digital data communication system comprising in combination:
 a. transmitting means for sequentially transmitting digital data words, each of said data words including a field code related to the sequence in which said data words were inputted by a data source to said transmitting means;
 b. receiving means including a memory for temporarily storing a selected number of said data words and apparatus for restransmitting said temporarily stored data words to said transmitting means;
 c. compare means for comparing each said transmitted digital data words with its corresponding retransmitted data word and for generating an error signal when a difference is detected;
 d. means for inserting in the continuous data stream any data word which said error signal indicates was incorrectly transmitted; and
 e. output means for outputting one of said temporarily stored data words when the sequence of subsequent field codes indicates that the word to be outputted is correct.

2. The digital communication system in accordance with claim 1 wherein all error detection is based on a bit comparison of the retransmitted data word to its stored counterpart.

3. The apparatus of claim 1 wherein said field codes are selected such that there is a low probability of one valid code being changed into a second valid code due to errors in transmission.

4. The digital communication system in accordance with claim 1 wherein said data word includes a non-data portion comprising a start bit, a stop bit and the bits of said field code.

5. The digital system in accordance with claim 4 wherein the number of said non-data bits is independent of the number of data bits contained in each of said data words thereby providing a system wherein the ratio of data to non-data bits increases as the number of data bits in each of said data words increases.

6. A digital communication system in accordance with claim 1 wherein:
 said transmission means assigns in sequential order one of four field codes and any data word retransmitted because of an error introduced in the transmission process retains its original field code.

7. A digital communication system in accordance with claim 1 wherein the transmitting station determines which words have been verified as transmitted error free and the data words stored at the receiver are outputted in the same sequence they were entered into the transmitter.

8. The digital communication system in accordance with claim 1 including apparatus for retransmitting two words when an error is detected.

9. A method of accurately transferring a data message between remote locations, the method comprising the steps of:
 a. combining each of the digital information words comprising the message to be transmitted with a field code to form digital words;
 b. temporary storing in a first memory and in the absence of error sequentially transmitting said digital data words in a continuous data stream via first transmission means to a receiver where said data words are temporarily stored in a second memory;
 c. returning said digital data words via a second transmission means to compare means located at the point of origin of said data words where each of said retransmitted data words are compared with the corresponding transmitted word;
 d. reinserting into the continuous data stream any data word, which is found to differ from the word as transmitted; and
 e. outputting said temporarily stored data words in a sequence determined by examining the field codes of subsequently arriving data words to form an output data signal.

10. The method of transmitting digital data in accordance with claim 9 wherein the number of data words comprising a message is variable.

11. A system for accurately transmitting digital data words between remote locations, comprising in combination:
 a. means located at the point where the data originates for transmitting data in a continuous stream to the point of destination;
 b. means located at the point of destination for returning said data to the point of origin;
 c. means located at said point of origin for comparing each of the returned data to the previously transmitted counterpart and generating an error signal when a difference is found;
 d. means for reinserting into said continuous data stream any data word found to contain errors.

* * * * *